INVENTOR.
Gustav Bergson
BY
Eugene M. Whitacre
AGENT.

ELECTRO-METER AMPLIFIER

Filed Feb. 20, 1956 2 Sheets-Sheet 2

INVENTOR.
Gustav Bergson
BY
Eugene M. Whitacre
AGENT.

United States Patent Office 2,965,854

Patented Dec. 20, 1960

2,965,854

ELECTRO-METER AMPLIFIER

Gustav Bergson, Philadelphia, Pa.
(York Road and Sunset Lane, Hatboro, Pa.)

Filed Feb. 20, 1956, Ser. No. 566,533

3 Claims. (Cl. 330—139)

This invention relates generally to electrical amplifying systems for the amplification of direct currents and relatively low frequency alternating currents. More particularly, this invention relates to high gain electrometer amplifiers for amplifying extremely minute currents.

In the past, discharge devices, such as electrometer tubes of various types, have been used for amplifying very minute electrical currents. A troublesome effect has been encountered, especially in highly sensitive amplifying systems, in the introduction of error in the amplified output signal caused by grid current in the discharge device, the effect of which is to aid or oppose the signal current to be amplified so that the resultant signal current in the input circuit of the electrometer amplifier differs from the true signal current by the amount of the grid current. This is more significant for very small signal currents, since as the signal current approaches the order of magnitude of the grid current, the percentage error in the signal to be amplified may be relatively high.

The principal causes of grid current in a discharge device are electronic conduction to, positive ion conduction to, and electronic emission from the grid of the device and the grid current corresponding to any set of operating conditions will largely be due to a combination of these factors.

Electronic conduction to the grid, notwithstanding the possible presence of a negative biasing voltage applied between that element and the cathode emitter, arises principally due to a finite number of electrons given off by the emitter, with velocities sufficient to permit the biasing voltage to be overcome. Positive ion conduction comes about from collisions between the electrons and molecules of the residual gas in the tube. The resultant positively charged ions are then attracted to the negatively biased grid. Grid current due to electronic emission from the grid may be photoelectric, due largely to radiation from the cathode, thermionic, due largely to the proximity of the grid to the heated cathode, and secondary, due to bombardment of the grid by electrons and ions. It should be understood that current in the grid circuit due to electronic conduction to the grid is opposite in direction to ion current to the grid or electronic emission from the grid.

It is found that electronic conduction to the grid generally predominates for conditions of relatively low plate voltages and that positive ion current to and electronic emission from the grid predominate at higher plate voltages. The latter is primarily due to the increased energies of the electrons with the higher plate voltages, which results in more collisions with gas molecules at higher energy levels to produce more ions. In practice it is found that the various currents in the grid circuit may be balanced out by proper selection of the amplifier tube operating potentials. In other words, as the plate voltage is increased from a low value an operating point can be found where the net current in the grid circuit is zero. However, the plate voltage at this operating point turns out to be so low that there is very little, if any, amplification of the input signal, and the usefulness of the tube as an amplifier is lost.

It is, accordingly, an object of this invention to provide an improved electrometer amplifier having negligible grid current which is effected simultaneously with the achievement of normally permissible high amplification.

It is a further object of this invention to provide an improved high gain amplifying system for the faithful amplification of direct currents and relatively low frequency alternating currents having minimum effect of the grid current on the signal to be amplified.

In accordance with the invention, the electrometer tube used with the amplifying system is adjusted for the desired gain. As mentioned above, under operating conditions of high gain, the operating voltages on the amplifier tube are such that there is substantial grid current due to positive ion current to and electronic emission from the grid. In accordance with the invention, the error introduced by the grid current of the electrometer tube is eliminated by the provision of means connected with the grid of the amplifier tube which provides an equal and opposite current to balance out the error current. In one embodiment of the invention, the grid of a compensating tube is connected with the grid of the electrometer amplifier. The operating voltages of the compensating tube are adjusted to provide zero net grid current flowing in the two tubes. For this condition, the grid of the compensating tube draws electronic current which is equal and opposite to the net grid current in the electrometer tube due to positive ion current and electronic emission from the grid.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
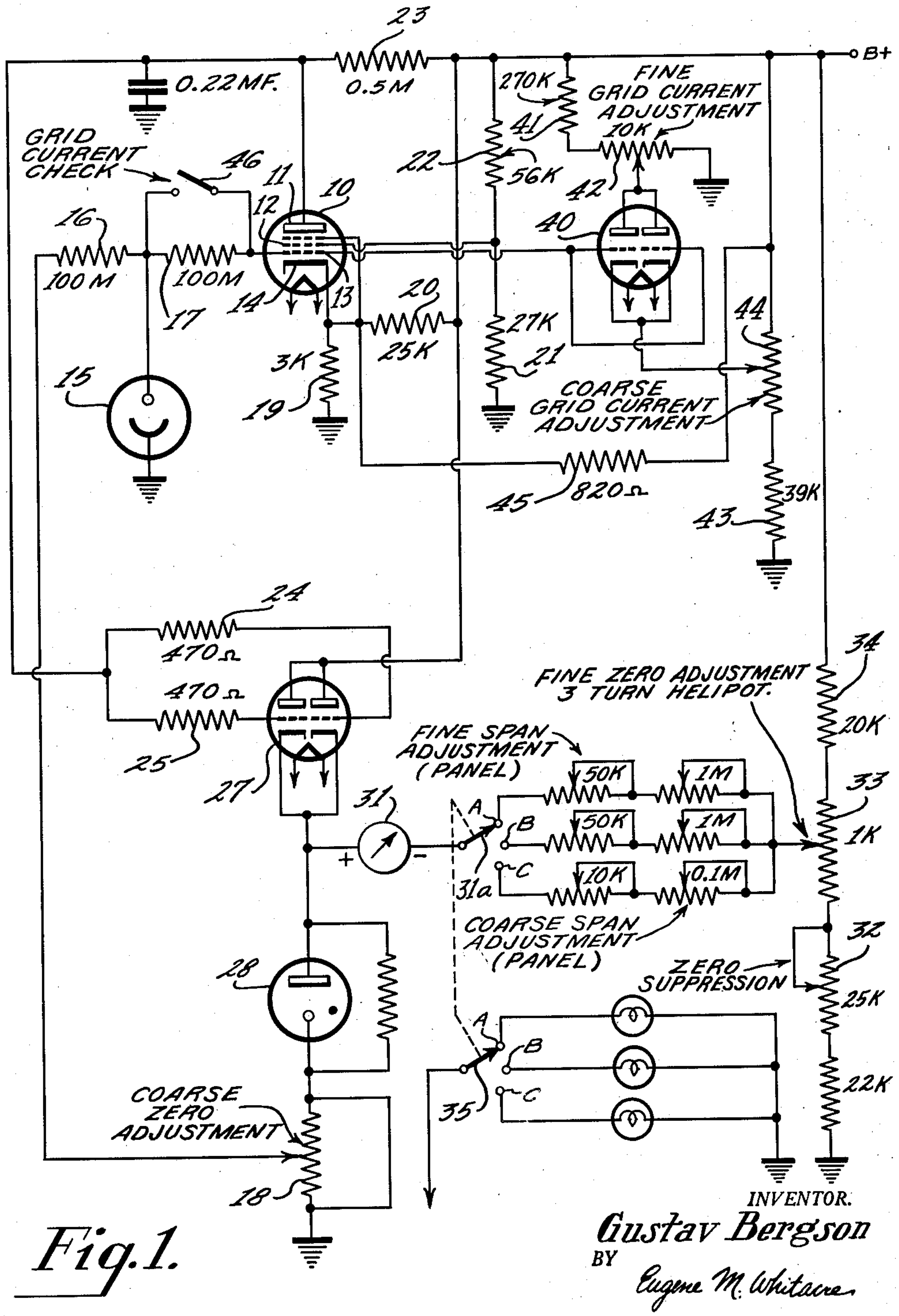
Figure 1 is a schematic circuit diagram of an electrical measuring system and including an electrometer amplifier embodying the invention.

With reference to Figure 1, the electrometer amplifier includes a pentode tube 10 having an anode 11, a suppressor grid, a screen grid 12, a control grid 13 and a cathode 14. The tube 10, which may, for example, be a 5693 type tube, is selected to provide acceptable operation as an electrometer amplifier.

The signal to be amplified is derived from a photoelectric tube circuit which includes a photoelectric tube 15 and a very high resistance load resistor 16. The photoelectric tube 15, which may be a 935 type tube, forms a part of a light measuring system. The circuit illustrated is for use in a gloss-meter which is a device for measuring the relative reflection of light from a given surface to indicate the degree of surface gloss. The light incident on the cathode of the photoelectric tube causes a very small current, the value of which is related to the intensity of the incident light. The anode current of the photoelectric tube is returned through the load resistor 16 which has a relatively high resistance value being on the order of 100 megohms. The signal current in the resistor 16 develops a voltage which is amplified by the electrometer amplifier. It is to be understood that the electrometer amplifier of the invention has general application as a D.C. amplifier and may be used to amplify signals from sources other than a photoelectric tube, such as from an ionization chamber or the like.

The anode of the photoelectric tube 15 is connected to the control grid 13 through a high resistance series grid resistor 17, the function of which will be hereinafter explained, and the cathode of the tube 15 is connected directly to ground. One end of the load resistor 16 is connected to the anode of the photoelectric tube 15, and the other end is connected through a portion of a resistor 18 to ground. The signal voltage developed across the load resistor 16 is thus applied between the control electrode 13 of the electrometer amplifier and ground.

The cathode of the electrometer tube 10 is connected to ground through a cathode biasing resistor 19. The resistor 19 also forms a part of a voltage divider network with a second resistance, the two resistors being connected between ground and the +B terminal of a well regulated power supply which delivers about 250 volts D.C. The voltage divider current flowing in the resistor 19 provides additional biasing voltage for the electrometer amplifier.

The screen grid 12 of the electrometer tube 10 is connected to the junction of a pair of series connected resistors 21 and 22 which are connected between ground and the +B terminal. These resistors form a voltage dividing network to provide operating potential for the screen grid 12. The anode 11 is connected through a load resistor 23 which has a relatively high resistance (on the order of one half megohm) to the +B terminal.

The anode 11 is also directly connected through a pair of oscillation suppression resistors 24 and 25 respectively to the control grids of a pair of parallel connected discharge devices 26 and 27, which are connected to operate as a cathode follower. The discharge devices shown in the drawings are a pair of triodes contained in a common envelope such as a 6BQ7. The respective anodes of the 6BQ7 are connected together and to the +B terminal, and the cathodes which are also connected together are connected to ground through a series circuit including a voltage regulator 28 and the resistor 18. The voltage across the regulator tube remains constant, thereby causing any changes in voltage between the cathodes of the 6BQ7 and ground to appear across the resistor 18.

A degenerative feedback circuit including a portion of the resistor 18 is connected back to the control grid 13 of the electrometer amplifier 10 through the resistors 16 and 17. The effect of the feedback circuit is to minimize the signal charge on the grid of the electrometer amplifier, and to stabilize the amplifier.

A meter 31 is connected between the common cathode terminal of the tubes 26 and 27 and a meter range switch 31*a*. The meter range switch selectively connects the meter to a point on a voltage divider network through paths of different resistance. Each of the separate meter paths include a pair of variable resistors connected in series to adjust the range or span of currents or other indicia to be read by the meter.

The most sensitive meter switch position, that is where the meter has full scale deflection for minimum current, is in the position C. Also connected with the switch 31*a* for simultaneous operation therewith is the switch 35 which connects 6.3 volts A.C. to one of three lights to indicate which meter range being used.

One end of each of the separate meter paths are connected to a common point on the voltage divider which comprises the resistors 32, 33 and 34, serially connected between the +B terminal and ground. The meter 31 may be roughly adjusted to a zero reading by varying the position of the tap on the resistor 18 when no signal is fed to the electrometer amplifier 10. The resistor 18 provides the grid biasing voltage for the electrometer amplifier in addition to the feedback voltage mentioned above. The resistor 33 is variable to provide means for adjusting the meter precisely to a zero reading when no signal is fed to the cathode follower stage.

When a signal voltage is impressed on the control grid 13 of the electrometer amplifier 10, and the amplifier is adjusted for high amplification, the amplified output signal is not duly representative of the input signal due to the grid current which flows in the electrometer circuit. As mentioned hereinbefore, the grid current or error current may be of the same order of magnitude as very small signal currents, thus introducing a relatively large percentage error. Any grid current in the amplifier 10 flows through the photoelectric tube load resistor 15, causing an error signal to be developed which adds to or subtracts from the desired signal.

In accordance with the invention, this error is eliminated by balancing the grid current of the electrometer tube to zero. To accomplish this, a second tube 40 is connected in parallel with the electrometer tube 10. The second tube is shown as a dual triode such as a 5692 type tube wherein the respective anodes, control grids and cathodes are connected together. The anodes of the tube 40 are connected to a tap on a voltage divider including the resistors 41 and 42 which are connected between ground and the +B terminal.

The cathodes of the tube 40 are connected to a point on a voltage divider network comprising the resistors 43, 44, 45 and 20. The voltage divider is connected between ground and the +B terminal.

As previously described, when the electrometer amplifier is adjusted for relatively high gain operation, the error current in the grid circuit is primarily due to positive ion current and electron emission from the grid since the electrometer tube is operated at a relatively high plate voltage. Therefore, the grid of the compensating tube 40 which is connected to the grid 13 of the electrometer tube 10 should be adjusted to draw electron current in an amount equal and opposite to the ion current drawn by the grid of the electrometer tube. To this end, the anode to cathode operating voltage of the compensating tube is adjusted so that the net grid current in the two tubes is zero. At this condition the plate voltage of the compensating tube would be less than that of the electrometer tube.

The variable resistor 44 in the cathode circuit of the compensating tube 40 provides a coarse adjustment for balancing out the grid current in the electrometer amplifier while the variable resistor 41 in the anode circuit of the compensating tube provides a fine adjustment.

The setting of the variable resistors 41 and 44 for zero or minimum grid current may be checked by use of the large resistor 17 which is in series with the control grids of the two tubes 10 and 40. A well insulated switch 46 is connected across the resistor 17. The condition of minimum or zero grid current is indicated when the closing and opening of the switch 46, that is the intermittent shorting of the resistor 17, causes no observable change in the meter 31 reading. The resistor 44 is adjusted for substantially zero net grid current with the resistor 41 in the mid-range position, and the final precise setting for zero grid current is made by the resistor 41.

Figure 2:
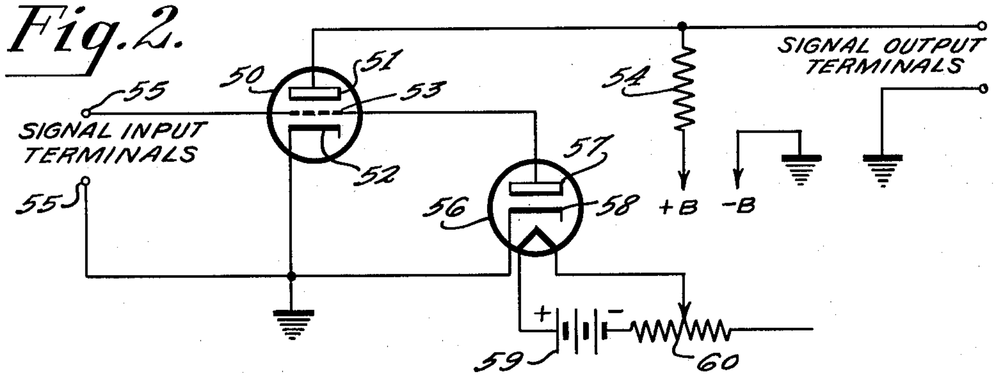
Figure 2 is a schematic circuit diagram of an electrometer amplifying system illustrating another embodiment of the invention.

Reference is now made to Figure 2 wherein the electrometer amplifier includes a triode tube 50 having an anode 51, a cathode 52 and a control electrode 53. The anode 51 of the tube is connected through a load resistor 54 to a source of polarizing potential +B, not shown. A signal to be amplified is applied to the input terminals 55 which are connected to the control electrode 53 and the cathode 52 which is connected at ground or reference potential. The electrometer amplifier when adjusted for the ordinary high amplification level draws grid current which is primarily due to ion current to the grid, and electronic emission from the grid.

To eliminate the error in the amplifier output signal from the electrometer amplifier the grid current is balanced out by the use of a diode 56, the plate 57 of which is connected to the electrometer control electrode 53, the cathode 58 being connected to ground and hence the electrometer cathode 52. Filament current for the diode 56 is derived from a battery 59 which is connected in series with a variable resistor 60. Naturally, if desired the battery could be replaced by any other suitable filamentary energizing voltage, A.C. or D.C.

The filamentary voltage on the diode is greatly reduced so that the diode current which corresponds to electronic current to the grid is extremely small and sufficient to nullify the grid current of the electrometer tube 50. The electrometer grid current can be balanced out exactly by adjustment of the variable resistor 60 to vary voltage of the diode. The electrometer amplifier described may be connected in any suitable metering circuit, such as that shown in connection with Figure 1.

Figure 3:
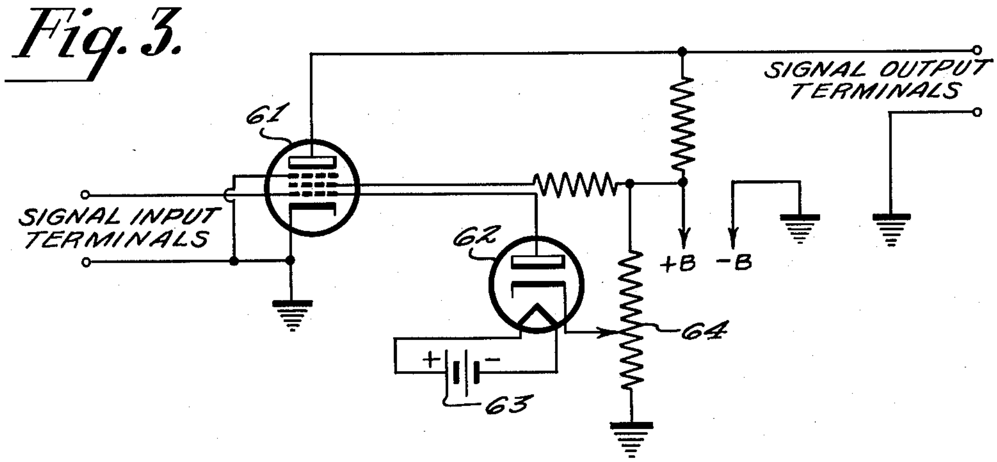
Figure 3 is a schematic circuit diagram of a modification of the amplifying system shown in Figure 2.

Figure 3 shows an electrometer amplifier similar to that illustrated in Figure 2 except that a pentode electrometer tube 61 is used, and the grid current thereof is balanced out by adjusting the cathode voltage of a compensating diode 62 rather than the filamentary voltage as was the case in the circuit of Figure 2. To this end, the filamentary voltage supplied by the battery 63 is lower than that required for balancing out the minute grid current of the electrometer amplifier, and the exact point of balance is attained by adjusting the cathode voltage of the diode 62. A voltage divider including a variable resistor 64 is connected between the +B terminal and ground to provide the cathode voltage for the diode, the cathode being connected to a variable tap on the resistor 64. A diode having a filamentary type cathode may be used in the circuits of Figures 2 and 3 to replace the tubes using indirectly heated cathodes.

Figure 4:
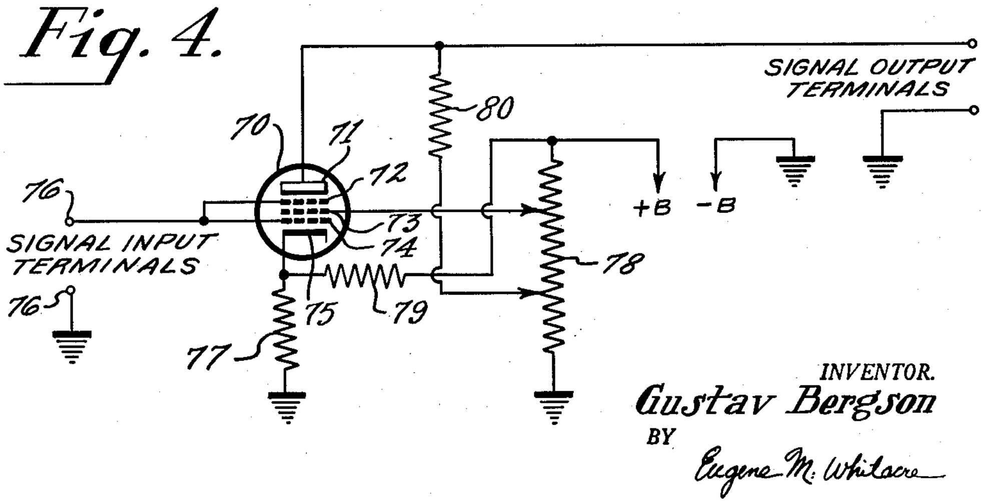
Figure 4 is a schematic circuit diagram of an electrometer amplifier illustrating a further embodiment of the invention.

With reference to Figure 4, a still further embodiment of the invention is illustrated which does not require an additional compensating tube. For this embodiment of the invention, the electrometer amplifier includes a multigrid tube 70 having an anode 71, a suppressor grid 72, screen grid 73, control grid 74 and cathode 75. The signals to be amplified are applied across a pair of input terminals 76, which are connected respectively to the control grid 74 and ground. The cathode 75 is connected to ground or a point of fixed reference potential through a resistor 77, and to the +B terminal through a resistor 79. The resistors 77 and 79 form a voltage divider network which is adjusted to provide the proper operating bias potential for the tube 70.

The operating potential for the screen grid 73 and the anode 71 are derived from a voltage divider 78 which is connected between ground and the +B terminal. The voltage applied to the screen grid 73 is about that value necessary for normal operation of the pentode amplifier tube 70, or higher. On the other hand, the voltage applied to the anode 71 is relatively low as compared to that used for normal pentode operation. The high voltage on the screen grid 71 permits the amplifier to effect a reasonably high gain by maintaining the tube current of the pentode at a reasonable level. However, the electrons between the cathode and the screen grid develop relatively high energies due to the high screen voltage, and the error current in the control grid 74 circuit is, therefore, predominately due to the positive ion current, and electron emission from the grid. Due to the relatively lower plate voltage, the electrons in the suppressor grid space have relatively low energies so that the current to the suppressor grid is predominately electron current.

It has been found that the error current in the grid circuit can be balanced out by connecting the suppressor grid 71 to the control grid 74, and by adjustment of the plate and screen voltages as described. When the plate and screen voltages have been properly adjusted, the current in the suppressor grid is equal in magnitude and opposite in direction to the error current in the control grid circuit.

A resistor 80 is connected between the anode 71 of the electrometer tube 70, and the tap on the voltage divider 78, to provide a load resistance across which the amplified signal is developed. The amplified signal is available at the signal output terminals which are connected respectively to the anode 71 and ground.

The electrometer amplifier which has been described hereinabove permits maximum normal amplification of minute electrical currents without the disadvantageous effects introduced by the grid current which introduces an error into the signal current to be amplified. In accordance with the invention, these operating conditions are attained by balancing the grid current of the electrometer tube to zero by suitable compensating means such as those above described.

What is claimed is:

1. An electrometer amplifier system comprising a first and second electron discharge device each having at least an anode, a cathode and a control electrode, signal input circuit means having an impedance on the order of a hundred megohms connected between the control electrode and cathode of said first device whereby a potential is developed as a result of minute grid current flow which potential tends to adversely affect the operation of said amplifier, output circuit means connected to the anode of said first device, direct current conductive circuit means connecting the control electrodes of said first and second devices, operating potential supply means for providing a potential of a magnitude to condition said first device to effect amplification of signals impressed on said input circuit means connected to the anode of said first device thereby causing an error current to flow in the signal input circuit due to positive ion conduction to and electron emission from the control electrode of said first device, and further operating potential supply means connected to the anode of said second device for providing a lower potential than said first named operating potential supply means and of a magnitude to condition said second device to produce a current in the control electrode of said second device which is equal and opposite to the error current due to said first device.

2. An electrometer amplifier comprising an electron discharge device having at least an anode, suppressor grid, screen grid, control grid and cathode, means connecting said control grid to said suppressor grid, signal input circuit means having an impedance on the order of a hundred megohms connected between said control grid and said cathode, operating potential supply means connected between said screen grid and said cathode of a relatively high value to provide amplification of signals impressed on said input circuit means thereby causing control grid current to flow in said signal input circuit due to ion current to the control grid and electron emission from the control grid, and operating potential means connected between said anode and said cathode of a value less than that of said screen grid and sufficiently low to cause current to flow in said suppressor grid substantially equal in magnitude and opposite in direction to the control grid current in said input circuit.

3. An electrical amplifying system for amplifying direct currents and relatively low frequency alternating currents comprising an electron discharge device having at least an anode, a cathode and a control grid, signal input circuit means having an impedance on the order of a hundred megohms directly connected between said control grid and said cathode whereby a potential is developed as a result of minute grid current flow which potential tends to adversely affect the operation of said amplifier, operating potential supply means connected with said discharge device between said anode and said cathode, said operating potential being of a value to effect relatively high amplification of signals impressed on said input circuit means causing said discharge device to draw grid current, a second discharge device having at least an anode, a cathode and a control grid, means connecting the control grid of said second discharge device directly to the control grid of said first discharge device, the cathode of said second discharge device directly connected with the cathode of said first discharge device, operating potential supply means connected between the anode and cathode of said second discharge device for providing an operating potential of a value to cause said second discharge device to draw grid current which is equal in magnitude and opposite in direction to the grid current drawn by said first device.

References Cited in the file of this patent

UNITED STATES PATENTS

| | | |
|---|---|---|
| 2,017,192 | Wolff | Oct. 15, 1935 |
| 2,035,289 | Bartels | Mar. 24, 1936 |
| 2,158,248 | Numans | May 16, 1939 |
| 2,392,416 | Sorensen | Jan. 8, 1946 |
| 2,658,180 | De Boisblanc | Nov. 3, 1953 |
| 2,676,268 | Schorr | Apr. 20, 1954 |
| 2,739,286 | Schede | Mar. 20, 1956 |
| 2,799,055 | Hare et al. | July 9, 1957 |

OTHER REFERENCES

Text book, "Theory and Applications of Electron Tubes," by Reich, 1944 edition, McGraw-Hill Book Co., page 126, Figure 5–2.

Article, "Electrometer Tubes for the Measurement of Small Currents," by J. A. Victoreen, pub. in Proc. I.R.E., vol. 37, No. 4, April 1949, pages 432–441.